March 1, 1966　　　H. J. DINSTBIR　　　3,237,330
WARNING DEVICE FOR VEHICLES
Filed March 5, 1964
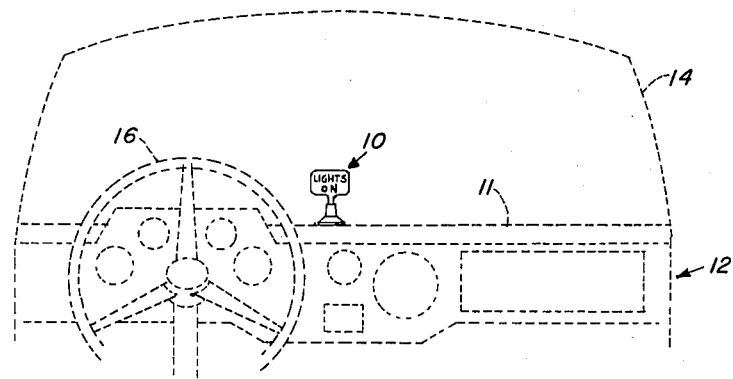
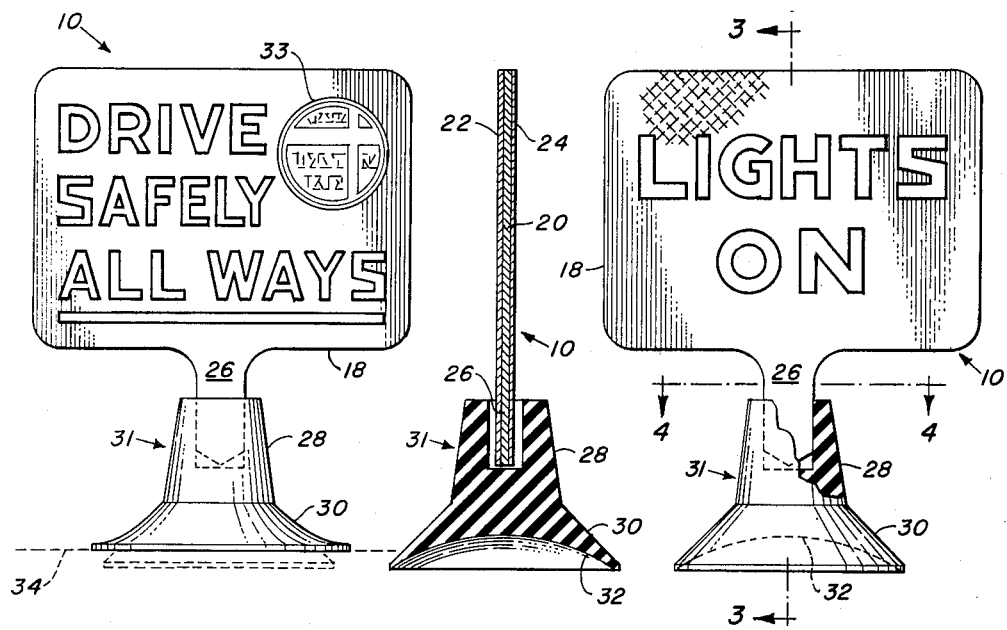
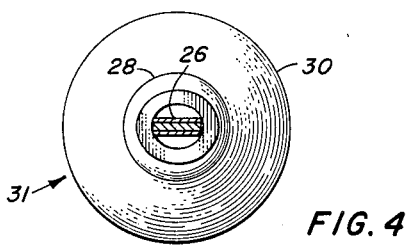
INVENTOR.
HOWARD J. DINSTBIR
BY
Baldwin & Martin
ATTORNEYS United States Patent Office 3,237,330
Patented Mar. 1, 1966

3,237,330
WARNING DEVICE FOR VEHICLES
Howard J. Dinstbir, P.O. Box 1703, Jacksonville 1, Fla.
Filed Mar. 5, 1964, Ser. No. 349,633
1 Claim. (Cl. 40—129)

This invention relates to warning devices for use with road vehicles and more particularly to a novel and improved warning device specially adapted for use with automobiles, buses, trucks and the like.

Many state highway safety departments and other agencies of a like nature recommend that drivers keep the headlights of their vehicles turned on during the daylight hours. Also, some State laws require that drivers keep the headlights of their vehicles turned on during the daytime under certain weather conditions, such as rain, at which times visibility is impaired. The purpose of such daytime use of headlights is primarily that the vehicle will be seen readily by other drivers. Particularly on high speed highways, with the attendant fast closing speed of vehicles, it is exceedingly important that a driver be made aware of all vehicles in his immediate vicinity.

Therefore, it is one of the objects and purposes of the present invention to encourage drivers to utilize the headlights of their vehicles during the daytime so as to improve the overall safety of driving as well as to comply with traffic laws, where applicable.

One of the difficulties encountered in encouraging observation of the above described safe driving rule is that the driver often accidentally forgets to turn off his headlights when he parks the vehicle. This can result in a sufficiently complete discharge of the starting battery of the vehicle that, particularly in cold weather, the driver cannot start the vehicle again without recharging the battery or without obtaining other assistance, which often is costly. As a result many drivers are discouraged from keeping their headlights on during the daytime.

It is therefore a further object and purpose of the present invention to provide novel and improved means both for reminding a driver to turn on his headlights during the daytime and for providing an effective reminder to a driver to turn off his headlights when the vehicle is stopped either at the end of the trip or temporarily during the trip.

It is still further an object of the present invention to provide a novel and improved warning device satisfying the last described objects and purposes of the invention and which is simple and economical to manufacture so as to provide a low cost item which is susceptible of mass production and distribution thereby encouraging acceptance of its use and which is also thereby adapted to be used as a "give-away" item by manufacturers or dealers in road vehicles or fuel and accessories therefor.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawing, in which:

FIG. 1 is a general representation of the dashboard area of a vehicle such as an automobile as viewed from the driver's seat, with a warning device constructed in accordance with this invention mounted for ready observation and accessibility by the driver of the vehicle;

FIG. 2 is an enlarged front elevational view, partly in section, of the warning device of FIG. 1;

FIG. 3 is a cross-sectional view substantially along the line 3—3 of FIG. 2;

FIG. 4 is a cross-sectional view substantially along the line 4—4 of FIG. 2; and FIG. 5 is an elevational view of the warning device of FIG. 2 illustrating other aspects and advantages of the device.

With reference to the drawing, and particularly FIG. 1, the warning device of this invention is generally indicated at 10. The device is shown in the environment for which it is intended for use, namely a road vehicle such as an automobile, truck, bus and the like. More particularly, the device is shown mounted on the upwardly facing, generally horizontal surface 11 of a dashboard, generally indicated at 12, of such a vehicle. The outline of the front windshield of the vehicle is indicated at 14, and the steering wheel at 16. It will thus be apparent that the device is intended to be mounted adjacent the driver of the vehicle, whereby it will be readily accessible to the driver and even more importantly will be readily visible to the driver while not impairing his vision. This aspect of the invention will be discussed more fully hereinafter.

With reference to FIGS. 2–5 of the drawing, the device 10, in a preferred embodiment, comprises a flat or planar indicator member 18 which is of laminated construction. The indicator member comprises a center or inner member or ply 20 and a pair of outer members or plies 22, 24. The material or materials from which the member 18 is formed should be relatively stiff or rigid, or at least in its final form the member should be relatively stiff or rigid. In the specific embodiment shown, the member 18 is generally rectangular in plan, although the contour or overall geometric configuration is a matter of choice and may be varied provided that the primary objects of the invention are maintained. Extending from the lower edge of the indicator member is a relatively short, integral, coplanar stem 26. In the embodiment shown, the stem is of the same laminated construction as the remainder of the indicator member. However, if desired, and for example, only one of the plies such as the center one may be used to form the stem. In any event, the indicator member may be stamped or otherwise suitably formed from a single or multi-ply sheet of suitable material such as one of those commonly referred to as plastics or from fiberboard which may be plastics impregnated for extra strength and wear resistance.

The stem 26 is engaged within an opening or recess in a frusto-conical boss 28 which in the preferred embodiment is integral with a suction cup 30. The boss and cup form a mounting or attaching member 31 by means of which the indicator member may be rotatably and detachably mounted to a suitable surface of a road vehicle. The suction cup 30 has a generally frusto-conical outer surface and a parti-spherical cavity as a bottom surface. The radius of curvature of the cavity and the included angle of the surface 30 are selected to provide a generally thin, tapered lip extending around the lower portion of the suction cup. The material from which the mounting member is fabricated is resiliently deformable and susceptible of providing an air seal so that when the cup is pressed firmly onto a surface, such as shown at 34 in FIG. 5, and the cup deformed from the broken line condition shown to the full line condition shown, the cup will be firmly yet releasably secured to the surface 34 by suction. In the preferred embodiment, the mounting member is formed from a relatively soft, pliable rubber-like material in order to obtain the desired characteristics and function of the mounting member.

The opening or recess in the bos 28 is circular in cross-section and extends from the upper end of the boss opposite the cavity 32 and coaxially of the boss. The recess terminates short of the concavity 32. The stem 26 of the indicator member is generally rectangular in cross-section. In accordance with one aspect of the invention, the distance between opposite corners of the cross-section of the stem is sufficiently greater than the unstressed diameter of the opening in the boss 28, that when the stem is inserted into the opening, the bordering surface or wall defining the opening will, as is shown in FIG. 4, be deformed into a generally ovoid shape. The stem will thus be resiliently gripped by the wall forming the recess so that the indicator member will be retained in vertical position and will be frictionally held in a desired adjusted rotational position about the axis of the boss 28. In order to facilitate insertion of the stem into the opening in the boss, the terminal or outer free end of the stem is of gradually reduced width or cross-section, providing in the specific embodiment shown a pointed or tapered portion. Also, in the specific embodiment shown the stem is of substantially greater length as compared to the depth of the opening in the boss 28, so that with the stem bottomed in the opening, the lower edge of the main portion of the indicator member 18 will be spaced from and above the upper surface of the boss. This relationship improves the aesthetics of the overall configuration and also eliminates any tendency of abrasion between the lower edge of the indicator member and the upper surface of the boss. It will also be observed that the edge of the indicator member where the stem is joined is faired in a generally arcuate fashion. This strengthens the juncture between the stem and the remainder of the indicator member as opposed to sharp corners in these regions.

In accordance with the invention, and as shown in FIGS. 1 and 2, one side or surface of the indicator member is provided with the legend "LIGHTS ON" or similar wording to remind the driver of a vehicle both to turn on and turn off the headlights of his vehicle, as appropriate. In a specific embodiment the legend is in black and the background area is of the color frequently referred to as brilliant orange. This is the color used, for example, in the marine and aircraft industry to improve significantly the visibility of a portion of an aircraft or life saving devices on a ship so that they can be detected at greater distances. In any event, it is preferred that the color of the background area or of the legend itself be highly visible yet non-reflective so that the driver's attention will be drawn to the indicator member, but his visibility will not be impaired by a reflecting surface.

In use the warning device is secured to a suitable interior surface of a vehicle, such as the usual horizontal surface of the dashboard. It should be located close to the driver's position so that it can readily be reached by the driver and also so that it will be within his normal range of vision. However, care should of course be taken not to locate the device where it will impair or interefere with the vision of the driver. Suitable and preferred locations are just to the right or left of the steering wheel. The indicator member may be manually adjusted angularly about the longitudinal axis of the stem by gripping the member and turning it relative to the attachment member 31. The indicator member should be adjusted so that the above described legend bearing surface is generally facing in the direction of the driver whenever the vehicle lights are on.

The side or surface of the indicator member opposite that shown in FIG. 2 is preferably provided with a lower visibility color and with a different legend or the like and it may be used if desired to indicate the condition of another controllable element of the vehicle. In the specific embodiment shown, and as illustrated in FIG. 5, the opposite side of the indicator member is very favorably adapted to be used for advertising purposes alone or in conjunction with a useful traffic safety slogan to tend to improve the driver's awareness of safe driving habits. If the device is used as a "give-away" item the manufacturer's or dealer's name or trademark might be provided as at 33, and the outline of the member 18 might conform to the round, oval, hexagonal or other shape of a geometric trademark. While as described above the indicator member may be left with the side shown in FIG. 2 facing the driver to remind him to turn on or off the vehicle lights, the driver may angularly adjust the indicator, when the lights are not on, so that the "LIGHTS ON" legend is not visible, such as by rotating the member 18 until the opposite face of the indicator is facing him.

As previously described, the specific indicator member shown is of multi-ply construction. The printing or other indicia on the outer layers 22, 24 may be placed thereon either before or after the laminate is built-up and the indicator member stamped from a larger sheet or strip. By way of example the outer layers 22, 24 might be in the form of preprinted decals, adherent tape or the like applied to the center layer or core 20. By way of further example, the legends and coloring might be applied by offset printing or the like to the opposite sides of a strip or sheet of laminated or single thickness material as a step or steps in an automatic printing and stamping process. From the above it will be apparent that the warning device of this invention is readily susceptible to a variety of economical mass production techniques.

Thus it will be seen that there has been provided a novel and improved warning device for road vehicles which fulfills the stated objects of the invention. While the device has been primarily described in the terms of a preferred embodiment, it will be apparent to those skilled in the art that various modifications could be made without departing from the spirit and true scope of the invention. For example, the peripheral configuration of the indicator member might be varied as might the specific means for attaching the indicator member to the vehicle. Therefore, the foregoing description and accompanying drawing are to be taken primarily as illustrative of and not as limiting the scope of the invention which is to be defined by reference to the appended claim.

What is claimed as new and what it is desired to secure by Letters Patent of the United States is:

A warning device for road vehicles comprising a flat, rigid, double faced, indicator member of generally rectangular plan having an integral coplanar stem generally rectangular in cross-section extending from a lower edge thereof, at least one face of said indicator member bearing a legend indicative of a condition of the headlights of a vehicle, said one face of the indicator member having a highly visible, non-reflective coloration on at least a portion thereof which is distinctly different in color from the other face, whereby a driver's attention will be drawn to said legend but the vision of the driver will not be thereby impaired, and a mounting member of rubber-like material for detachably securing the indicator member in upstanding position to the generally horizontal upper dashboard surface of a vehicle within the normal range of vision of the driver and so as to be readily manually accessible to the driver from his normal driving position, said mounting member including a suction cup at the bottom thereof and an integral boss having an axis and extending from the portion of the suction cup opposite the concavity thereof and coaxially therewith, said boss being provided with an opening extending axially of the boss entering through its upper surface and terminating short of said concavity, said opening being generally cylindrical when said boss is unstressed, said stem having a dimension between opposite corners of its cross-section which is greater than the unstressed diameter of said opening, said stem being disposed in said opening and stressing said boss and deforming the wall of said opening from its unstressed generally circular cross-sectional shape into a generally ovoid shape, the wall of the opening gripping the stem and frictionally retaining the same while permitting manual adjustment of the indicator member angularly about the longitudinal axis of the stem between selective positions in which said one and said other of said faces, respectively, faces the driver.

References Cited by the Examiner

UNITED STATES PATENTS

| | | | |
|---|---|---|---|
| 1,785,357 | 12/1930 | Levin | 40—135 X |
| 1,912,540 | 6/1933 | Pazourek | 40—135 X |
| 2,181,977 | 12/1939 | Magovern | 40—10 |
| 2,277,981 | 3/1942 | Horton | 40—129 X |
| 2,706,806 | 4/1955 | Johnson | 40—129 X |
| 2,711,153 | 6/1955 | Wendt | 116—28 X |
| 2,932,913 | 4/1960 | Hannon | 40—135 X |
| 3,007,435 | 11/1961 | Peterson | 40—129 X |
| 3,141,253 | 7/1964 | Bartram | 40—129 |

References Cited by the Applicant

UNITED STATES PATENTS

| | | |
|---|---|---|
| 596,835 | 1/1898 | Van Hohenhoff. |
| 732,581 | 6/1903 | McGrath. |
| 1,041,178 | 10/1912 | Schumacher. |
| 1,549,156 | 8/1925 | Shoemaker. |
| 1,750,173 | 3/1930 | Havelock et al. |
| 2,742,251 | 4/1956 | Udvardy. |
| 2,784,970 | 3/1957 | Heiner. |
| 2,839,858 | 6/1958 | Williams. |
| 3,081,054 | 3/1963 | Westervelt. |

WALTER A. SCHEEL, *Primary Examiner.*

JEROME SCHNALL, *Examiner.*